US006529973B1

United States Patent
Spaur

(10) Patent No.: US 6,529,973 B1
(45) Date of Patent: Mar. 4, 2003

(54) PROGRAMMABLE GENERIC READ CHANNEL CONTROL DEVICE

(75) Inventor: Michael R. Spaur, Irvine, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/576,705

(22) Filed: May 22, 2000

(51) Int. Cl.[7] .............................................. G06F 1/00
(52) U.S. Cl. ..................... 710/60; 710/61; 360/72.1; 360/75
(58) Field of Search ........................... 710/100, 20, 22, 710/29, 31, 35, 60, 61, 104, 105, 305, 308, 117, 124, 74, 68; 360/72.1, 75

(56) References Cited

U.S. PATENT DOCUMENTS

| 4,647,992 | A | | 3/1987 | Vinal |
| 4,910,616 | A | | 3/1990 | Sirai et al. |
| 5,261,058 | A | * | 11/1993 | Squires et al. ............... 395/275 |
| 5,475,540 | A | | 12/1995 | Gold |
| 5,506,735 | A | * | 4/1996 | Okazaki ....................... 360/75 |
| 5,640,538 | A | * | 6/1997 | Dyer et al. .................. 395/500 |
| 5,825,318 | A | | 10/1998 | Patapoutian et al. |
| RE37,818 | E | * | 8/2002 | Holsinger .................. 360/72.1 |

OTHER PUBLICATIONS

Anonymous, "*PRML Read Channel with PR4, 8/9 Endec, 4–burst Servo*", Mar. 1997, Texas Instruments Inc., Storage Products Group, pp. 1–3.

Anonymous, "*Mass Storage Technology Fact Sheet*", © 1999 Texas Instruments, Inc., Storage Products, pp. 1–3.

Anonymous, "*SX–A Family FPGAs*", Sep. 1999, © 1999 Actel Corporation, pp. 1–56.

* cited by examiner

Primary Examiner—Rupal Dharma
Assistant Examiner—Raymond N Phan
(74) Attorney, Agent, or Firm—Martine & Penilla, LLP

(57) ABSTRACT

The present invention provides a programmable generic read channel control device and circuitry for generating an output signal to control read/write operations. The programmable generic read channel control device includes a set of extension timer, a set of configuration registers, a set of AND gates, and an OR gate. The extension timers are programmed to generate a set of pulses of programmable width in response to a read gate and write gate signal. Each of the pulses is defined by a leading edge pulse and a trailing edge pulse. The set of extension timers includes a short write gate extension timer configured to generate a write gate short leading edge pulse and a write gate short trailing edge pulse defining a write gate short pulse width. The configuration registers store a set of configuration data for the pulses with each configuration register storing one configuration data for either a leading edge or a trailing edge pulse of one of the pulses. The configuration data indicates whether the associated pulse is enabled. The AND gates are arranged to receive the pulses of programmable width with each AND gate receiving either a leading edge or a trailing edge of one of the pulses as a first input. Each AND gate also receiving a configuration data as a second input that allows the first input to be transmitted as an output signal when the configuration data at the second input is enabled. The OR gate is arranged to combine the output signals from the set of AND gates to generate the output signal such that the output signal is generated from only the leading or trailing edges of the pulses from the AND gates receiving the enable signals.

22 Claims, 5 Drawing Sheets

PROGRAMMABLE GENERIC READ CHANNEL CONTROL DEVICE

BACKGROUND OF THE INVENTION

1. Field of the Invention

This invention relates generally to rotating magnetic storage devices, and more particularly to read channel control devices that can generate control signals for controlling read/write operations in the rotating magnetic storage devices.

2. Description of the Related Art

Modem computer systems typically include one or more hard disk drives in which a large amount of data, including operating system files, application programs, and other files can be stored. The hard drives typically store information in one or more hard disks using magnetic technology. Each hard disk is configured in concentric tracks, each of which is divided into sectors.

For data storage and access, conventional hard drives typically employ one or more read/write heads to write or read data to and from a specified track in the disk. A track in a hard disk typically includes servo fields and data fields. The servo fields store embedded servo data patterns used to properly position the read/write heads over the tracks while the data fields store end user data.

Conventional hard drives generally employ linear or rotary head positioning mechanisms to properly position and maintain the read/write heads over the desired tracks for reading or writing data. The head positioning mechanisms typically use a set of signals for controlling read/write channel control. For example, a read gate signal is used to recover encoded user data from data fields while a write gate signal is used in writing user data to data fields. In addition, a servo gate signal is used to recover encoded servo data from servo fields.

From these signals, conventional head positioning mechanisms typically generate derivative signals to perform various control functions in a read channel device. For example, one derivative signal LOWZ is generated to set a first stage read amplifier to low impedance to remove stored voltage from an earlier write operation. Another derivative signal FACQ sets the first stage read amplifier into "fast attack" mode to quickly adjust to the input signal strength, i.e., amplitude. A control signal version of the read gate signal sets the first stage read amplifier to "normal tracking" mode to follow and compensate for modulation in the input signal strength. In addition, the control signal version of the read gate signal modifies the data recovery channel bandwidth to optimize signal to noise ratio for the input signal frequency. A data recovery device in the hard drive then uses these signals to control the read/write operations of read/write heads.

Unfortunately, however, these channel control functions require costly external circuitry to extend read gate, write gate, or servo gate signals. In particular, producing pulse of programmable duration at the leading or trailing edges of read gate, write gate, or servo gate signals requires expensive external circuitry. In addition, the signal requirements for data recovery devices in the industry vary substantially. For example, each data recovery device may use different signals with varying polarity and timing requirements. Hence, the channel control functions typically needs to be customized to fit different data recovery devices. As can be appreciated, such customization can be costly to implement.

Thus, what is needed is a programmable channel read channel control device that is programmable for use with a variety of different data recovery devices without the cost associated with conventional devices.

SUMMARY OF THE INVENTION

Broadly speaking, the present invention fills these needs by providing a programmable generic read channel control device and circuitry. It should be appreciated that the present invention can be implemented in numerous ways, including as a process, an apparatus, a system, computer readable media, or a device. Several inventive embodiments of the present invention are described below.

In one embodiment, the present invention provides a programmable generic read channel control device for generating an output signal to control read/write operations. The programmable generic read channel control device includes a set of extension timers, a set of configuration registers, a set of AND gates, and an OR gate. The extension timers are programmed to generate a set of pulses of programmable width in response to a read gate and write gate signal. Each of the pulses may include a leading edge pulse and a trailing edge pulse. The configuration registers store a set of configuration data for the pulses with each configuration register storing one configuration data for either a leading edge or a trailing edge pulse of one of the pulses. The configuration data indicates whether the associated pulse is enabled. The AND gates are arranged to receive the pulses of programmable width with each AND gate receiving either a leading edge or a trailing edge of one of the pulses as a first input. Each AND gate also receiving a configuration data as a second input that allows the first input to be transmitted as an output signal when the configuration data at the second input is enabled. The OR gate is arranged to combine the output signals from the set of AND gates to generate the output signal such that the output signal is generated from only the leading or trailing edges of the pulses from the AND gates receiving the enable signals. The set of extension timers includes a short write gate extension timer configured to generate a write gate short leading edge pulse and a write gate short trailing edge pulse defining a write gate short pulse width. In addition, a flip-flop may be provided to receive a set of first control signals for setting and resetting the output signal of the OR gate.

In another embodiment, the present invention provides a programmable generic read channel control circuitry for generating an output signal to control read/write operations. The programmable generic read channel control circuitry includes a set of extension timers, a set of AND gates, and an OR gate. A first extension timer is capable of storing a first time value for generating a first pulse width in response to a read gate signal. A second extension timer is capable of storing a second time value for generating a second pulse width in response to the read gate signal. A third extension timer is capable of storing a third time value for generating a third pulse of programmable width in response to a write gate signal. A short write gate extension timer is capable of storing a fourth time value for generating a write gate short leading edge pulse and a write gate short trailing edge pulse defining a fourth pulse of programmable width in response to the write gate signal. Each of the pulse width is defined by a leading edge and a trailing edge. The AND gates are arranged to receive the pulses of programmable width, with each AND gate receiving either a leading edge or a trailing edge of one of the pulses as a first input. Each AND gate also arranged to receive an enable signal as a second input that allows the first input to be transmitted as an output signal when the enable signal at the second input is active. The OR gate is arranged to combine the output signals from the set of AND gates to generate the output signal such that the output signal is generated from only the leading or trailing edges of the pulses from the AND gates receiving the enable signals.

Advantageously, the programmable generic read channel control logic device and circuitry of the present invention allows any input signals to be combined in any suitable manner to meet the requirements of wide variety of read/write channel devices. This eliminates the need for costly external circuitry and produces a single device that is capable of controlling a variety of read/write channel devices that have different signal requirements. Thus, the programmable read channel control logic device provides significant savings in design cost. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, in which like reference numerals designate like structural elements.

DETAILED DESCRIPTION OF THE PREFERRED EMBODIMENTS

The present invention provides a programmable generic read channel control device and circuitry. It will be obvious, however, to one skilled in the art, that the present invention may be practiced without some or all of these specific details. In other instances, well known process operations have not been described in detail in order not to unnecessarily obscure the present invention.

The present invention provides a programmable generic read channel control device for generating a programmable set of output control signals. The programmable generic read channel control device includes a set of timers that can be triggered by input signals such as a read gate, a write gate, and/or a servo gate. Additionally, it includes a programmable array of logic that allows these input signals to be combined in any suitable manner to meet the requirements of wide variety of read/write channel devices available in the industry. This eliminates the need for external circuitry and produces a single device that is capable of controlling a variety of read/write channel devices that have different signal requirements.

Figure 1:
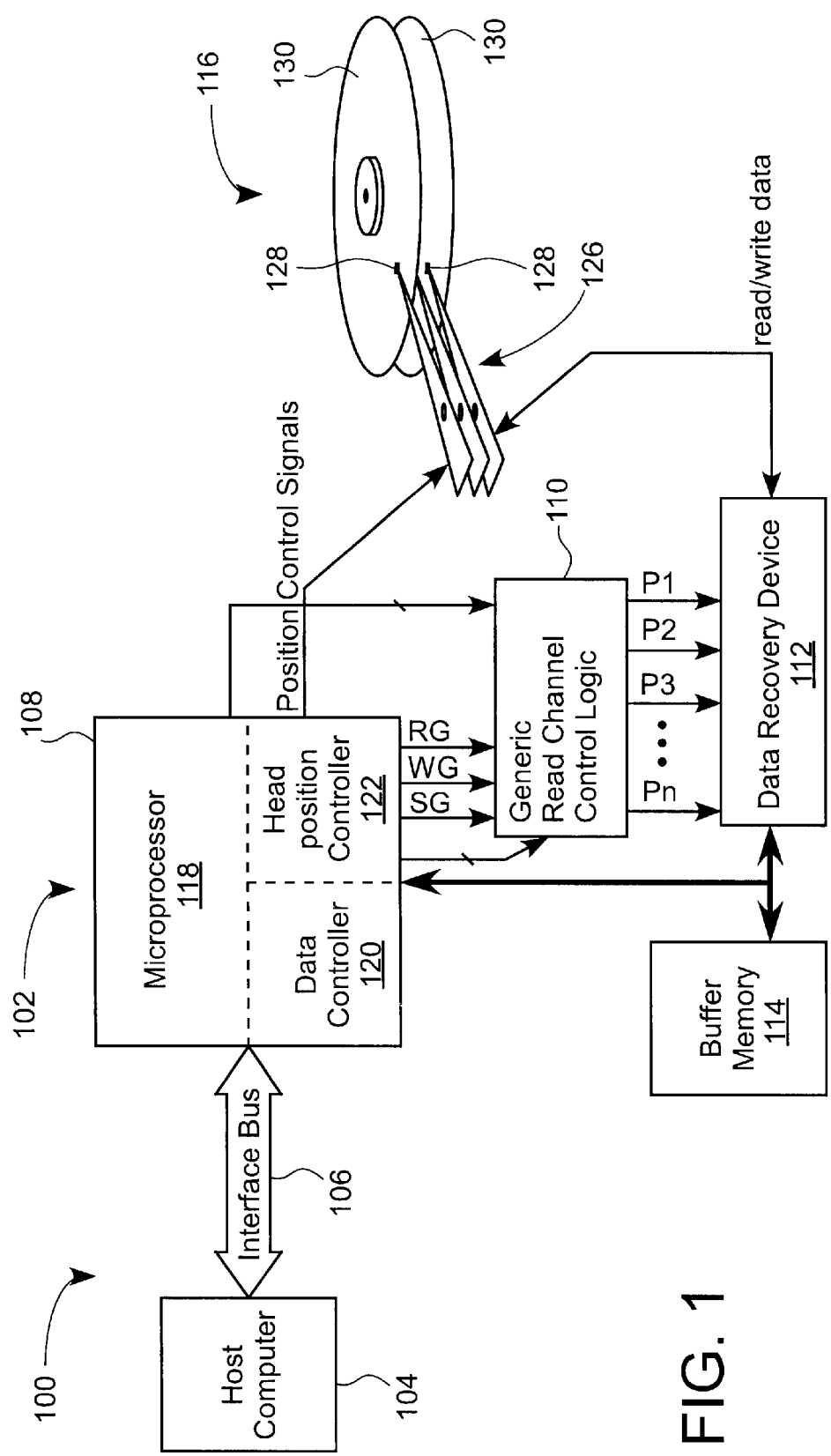
FIG. 1 illustrates a schematic block diagram of a computer system that includes an exemplary hard drive in accordance with one embodiment of the present invention.

FIG. 1 illustrates a schematic block diagram of a computer system 100 that includes an exemplary hard drive 102 in accordance with one embodiment of the present invention. The hard disk drive 102 is coupled to a host computer 104 through an interface bus 106 such as an IDE, SCSI, or PCI bus. The host computer 104 includes a host processor, main memory, and other well known components. Through the interface bus 106, the host computer 104 reads data from or writes data to the hard drive 102.

The hard drive 102 includes a hard disk controller 108, a programmable read channel control logic device 110, a data recovery device 112, a buffer memory 114, and a rotating data storage device 116. Coupled to the interface buss 106, the hard disk controller 108 processes information from the host computer 104 for writing data to or reading data from the rotating data storage device 116. The rotating data storage device 116 includes a head stack assembly 126 and a set of magnetic disks 130 (e.g., hard disks) that stores servo data and user data. Provided on the head stack assembly 126 is a set of read/write heads for reading and/or writing data from or to the magnetic disks 130.

The hard disk controller 108 includes a microprocessor 118, an data controller 120, and a head position controller 122. The data controller 120 is in communication with the interface buss 106 for controlling interface between the host computer 104 and the hard disk controller 108 and also for controlling access to the buffer memory 114. The microprocessor 118 is in communication with the data controller 120 and processes information (e.g., I/O commands and/or data) for writing data to or reading data from the rotating data storage device 116. The microprocessor 118 outputs commands to the head position controller, which generates position control signals. In response to the position control signals, the head stack assembly 126 positions a head 128 over a target track on a rotating hard disk 130 for reading or writing data. In addition, the microprocessor provides control signals such as timing values, processor override signals, and configuration data to the generic read channel control logic device 110. The hard disk controller 108 may be implemented using an application specific circuit, which includes a digital signal processor (DSP) such as TMS320C27x DSP from Texas Instruments.

To further control the timing of read/write operations, the head position controller 122 generates a set of gate signals: a read gate signal, a write gate signal, and a servo gate signal. The read gate signal triggers recovery of encoded user data read from a track while the write gate signal triggers recording of user data to the rotating data storage device 116. The servo gate signal, on the other hand, triggers recovery of encoded servo data from the track. Although such gate signals are illustrated in this embodiment, other control signals may also be used to control recovery or recording of data.

The programmable generic read channel control logic device 110 is coupled to receive the gate signals from the head position controller 122 and configuration data from the microprocessor 118. As will be discussed in more detail below, the configuration data is used to configure the read channel control logic device 100. In response to the gate signals, the read channel control logic device 110 converts the gate signals into a set of read/write channel control signals P1 to Pn. These read/write channel control signals P1 to Pn control the operation of the data recovery device 112.

In one embodiment, the read/write channel control signals include a LOWZ signal, an FACQ signal, an extended write gate signal, and a short write gate signal. The LOWZ signal triggers the setting of a first stage read amplifier in the data recovery device 112 to low impedance state to remove stored voltage from an earlier write operation. The FACQ signal triggers the first stage read amplifier into a "fast attack" mode to quickly adjust to the input signal strength, i.e., amplitude. The DEMOD signal is used to control the output of servo data while the POWERDOWN signal is used to control power provided to the data recovery device 112. The extended write gate signal is used to extend the write gate signal by a specified time while the short write gate extension signal extends the write gate signal by a shorter period of time.

The data recovery device 112 is coupled to receive the set of read/write channel control signals P1 to Pn from the generic read channel control logic device 110. The data recovery device is coupled to the head stack assembly 126 to transmit and receive data from the rotating data storage device 116. In a read operation, for example, the data recovery device 112 receives servo data and encoded user data from the storage device 130 and decodes the encoded user data transferring the decoded user data to the buffer memory 114. Then, the decoded user data is sent to the interface controller 120 for eventual transmission to the host computer 104. In a write operation, on the other hand, the buffer memory 114 stores user data from the interface controller 120. The data recovery device 112 then encodes the user data by accessing the buffer memory and sends the encoded user data to the head stack assembly 126 for storage in the storage device 116. Data recovery devices are also commonly known as read channel devices and are well known in the art. An exemplary data recovery device is T132P4902A read channel device from Texas Instruments having a disk data recovery path and an on-chip servo demodulator.

Figure 2:
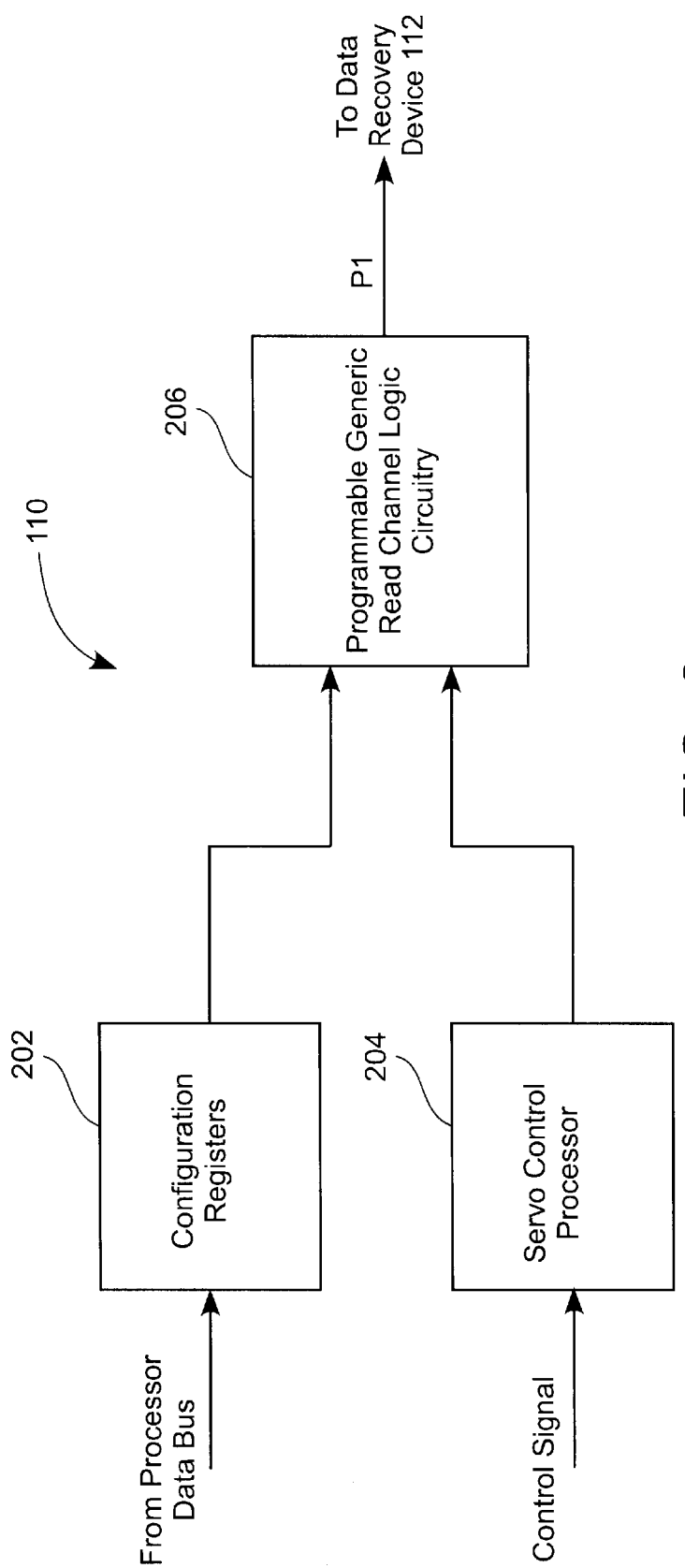
FIG. 2 shows a block diagram of a programmable generic read channel control logic device for producing a signal P1 in accordance with one embodiment of the present invention.

FIG. 2 shows a more detailed block diagram of the programmable generic read channel control logic device 110 for producing a signal P1 in accordance with one embodiment of the present invention. The read channel control logic device 110 includes a set of configuration registers 202, a servo control processor 204, a programmable generic read channel logic circuitry 206, and a pin 208. The configuration registers 202 store configuration data, which define elements in the programmable generic read channel logic circuitry 206 that will be used to generate a signal P1.

The output signal P1 is then sent to the data recovery device 112 for controlling read/write operations. The servo control processor 204 has a set of special opcodes or instructions for execution to generate Set_pin_1 and Reset_pin_1 signals for setting and resetting the output signal P1. It should be noted that the servo control processor 204 may also be provided in the head position controller 122 shown in FIG. 1. In response to a control signal from the head position controller 122, the servo control processor 204 executes the opcodes to set or clear the output signal P1 in the read channel logic circuitry 206. It should be appreciated that the read channel control logic device 110 may be used to produce any number of a plurality of control signals in parallel by duplicating its components in part or whole, or in series by providing associated configuration data suitable for each control signal.

Figure 3:
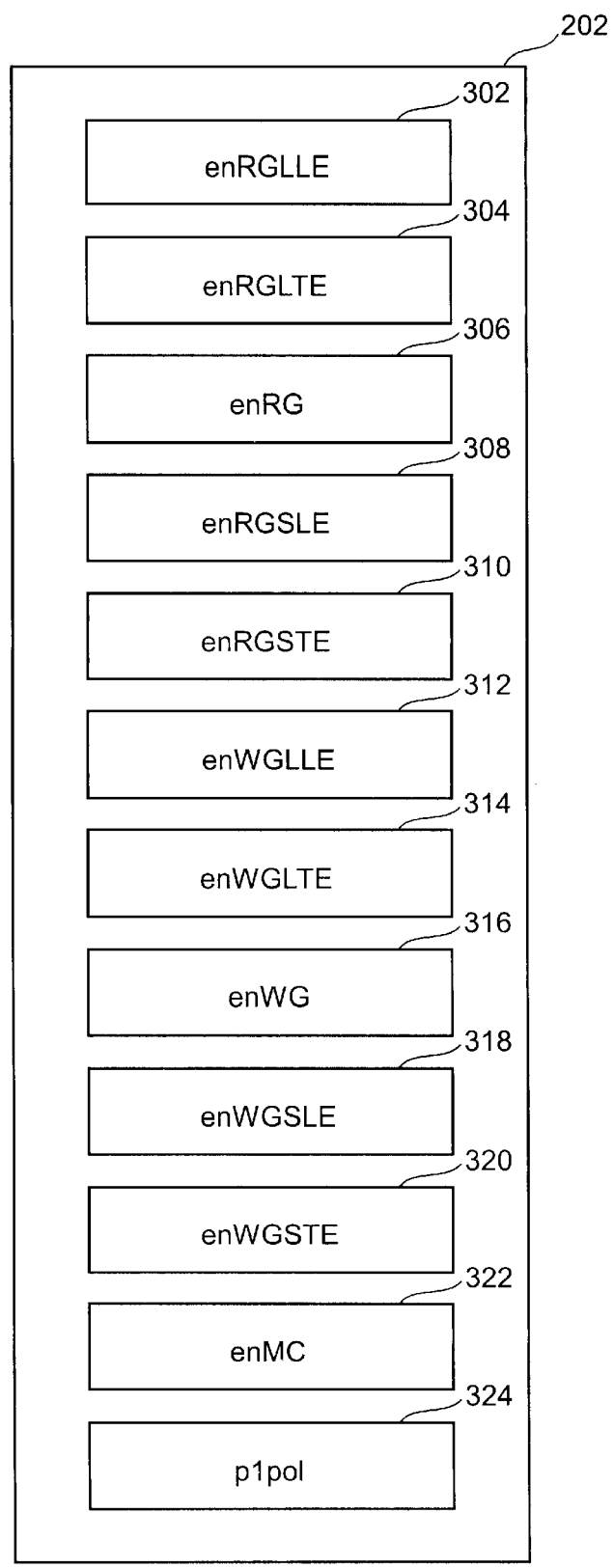
FIG. 3 illustrates a set of exemplary configuration registers in accordance with one embodiment of the present invention.

FIG. 3 illustrates a set of exemplary configuration registers 202 in accordance with one embodiment of the present invention. The configuration registers 202 include the following registers: enRGLLE register 302, enRGLTE register 304, enRG register 306, enRGSLE register 308, enRGSTE register 310, enWGLLE register 312, enWGLTE register 314, enWG register 316, enWGSLE register 318, enWG-STE register 320, enMC register 322, and p1pol register 324. The configuration data in these registers 202 are used to enable associated features when activated as shown in the following Table 1 in accordance with one embodiment of the present invention.

TABLE 1

| Configuration Register Bit | Function Enabled |
| --- | --- |
| enRGLLE | read gate long leading edge pulse |
| enRGLTE | read gate long trailing edge pulse |
| enRG | read gate signal |
| enRGSLE | read gate short leading edge pulse |
| enRGSTE | read gate short trailing edge pulse |
| enWGLLE | write gate long lead edge pulse |
| enWGLTE | write gate long trailing edge pulse |
| enWG | write gate signal |
| enWGSLE | write gate short leading edge pulse |
| enWGSTE | write gate short trailing edge pulse |
| enMC | servo control processor control |
| p1pol | pin output signal polarity |

Figure 4:
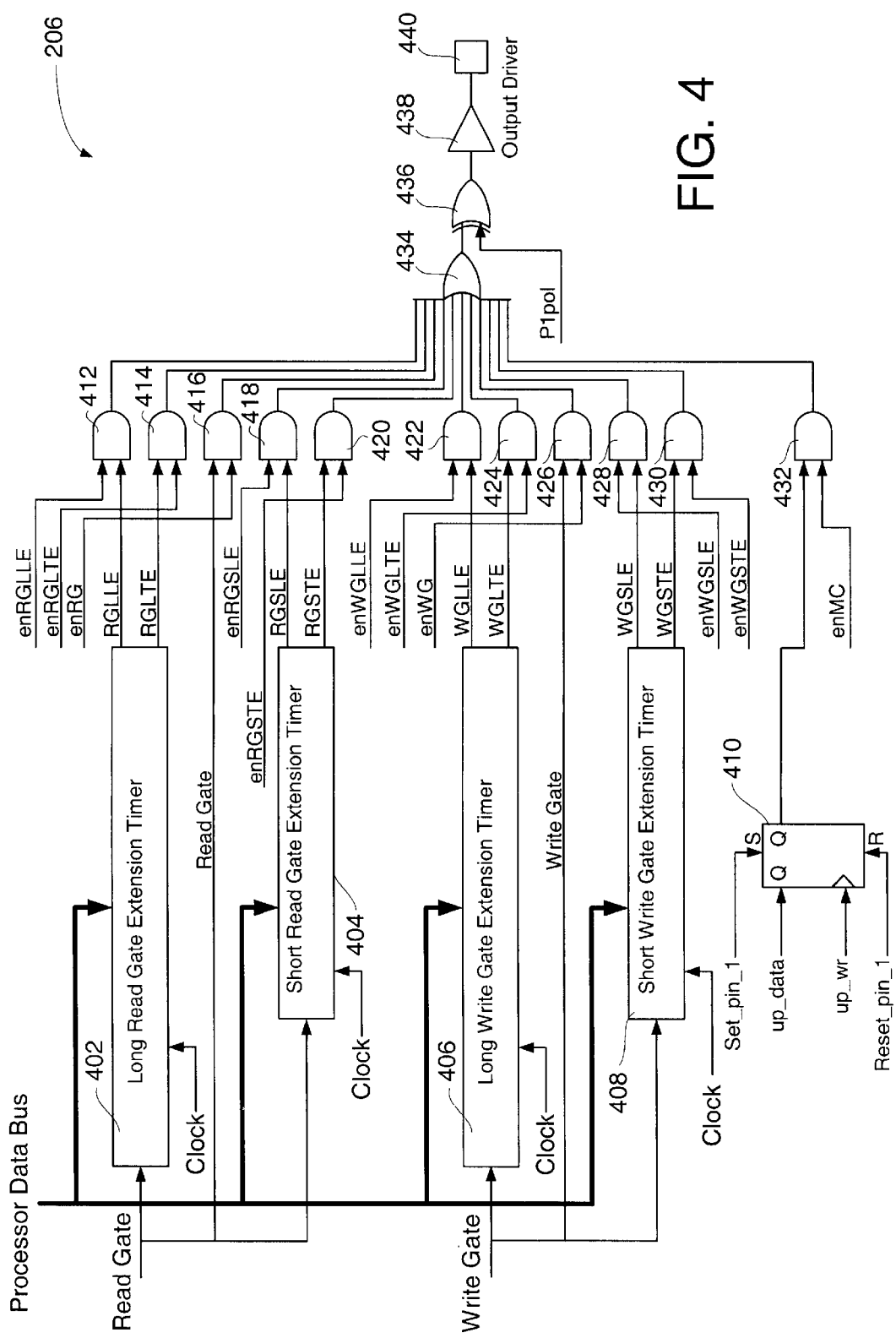
FIG. 4 shows a detailed schematic circuit diagram of a programmable generic read channel logic circuitry in accordance with one embodiment of the present invention.

The configuration data in the configuration registers 202 are provided to the read channel logic circuitry 206 for selectively programming the output signal. FIG. 4 shows a detailed schematic circuit diagram of the programmable generic read channel logic circuitry 206 in accordance with one embodiment of the present invention. The read channel logic circuitry 206 includes a set of programmable extension timers 402, 404, 406, and 408 for storing timing values from the processor 118.

Based on the stored timing values and the input clock signal, the timers 402 to 408 generate pulses of programmable pulse widths using either or both the rising or falling edge of read or write gate signals. The extension timers 402 and 404 are read gate extension timers that receive a read gate signal as input. The extension timers 406 and 408 are write gate extension timers receiving a write gate signal as input.

Specifically, the extension timer 402 is a long read gate extension timer that is used to generate longer programmable width pulses RGLLE and RGLTE from the leading and trailing edges of the read gate signal, respectively. Similarly, the extension timer 404 is a short read gate timer that generates shorter programmable width pulses RGSLE and RGSTE from the leading and trailing edges of the read gate signal, respectively. On the other hand, the extension timer 406 is a long write gate extension timer, which produces longer programmable width pulses WGLLE and WGLTE from the leading and trailing edges of the write gate signal, respectively. Likewise, the extension timer 408 is a short write gate extension timer that produces shorter programmable width pulses WGSLE and WGSTE from the leading and trailing edges of the write gate signal, respectively.

The programmable read channel control logic circuitry 206 also includes a flip-flop 410 that provides additional control to the servo control processor 204 and the microprocessor 118. Specifically, the flip-flop 410 receives Set_pin_1 and Reset_pin_1 signals from the servo control processor 204 to generate an output signal to set or clear the output P1 signal. To override the servo control processor 204, data signal up_data and write signal up_wr provided to the flip-flop 410 allows the microprocessor 118 to override set and reset functions of the servo control processor 204.

The outputs of the extension timers 402 to 408 and the flip-flop 410 are provided to a set of AND gates 412 to 432.

As shown in FIG. 4, each of the AND gates 412 to 432 is arranged to receive one output from the extension timers 402 to 408 and the flip-flop 410. The other input for each of the AND gates 412 to 432 is received from the configuration registers 202. For example, the AND gate 412 receives enRGLLE signal from the configuration register 302 and RGLLE signal from the extension timer 402. Similarly, the AND gate 432 receives the output of the flip-flop 410 and enMC signal from the enMC register 322. By thus providing a configuration signal to each of the AND gates 412 to 432, the AND gates 412 to 432 are effectively programmed to enable or disable transmission of non-configuration signal inputs.

The output results of the AND gates 412 to 432 are then provided to an OR gate 434 that produces an output signal, which is then fed into an XOR gate 436 as an input. As the other input, the XOR gate 436 receives polarity signal p1pol from the configuration register 324. When the polarity signal is asserted, the XOR gate 436 reverses the polarity of the input signal from the OR gate 434 to output a reversed polarity signal. Otherwise, the XOR gate 436 outputs the input signal from the OR gate 434. The output of the XOR gate 436 is then provided to an output driver 438 (e.g., buffer), which drives the received signal to an output pin 440.

Figure 5:
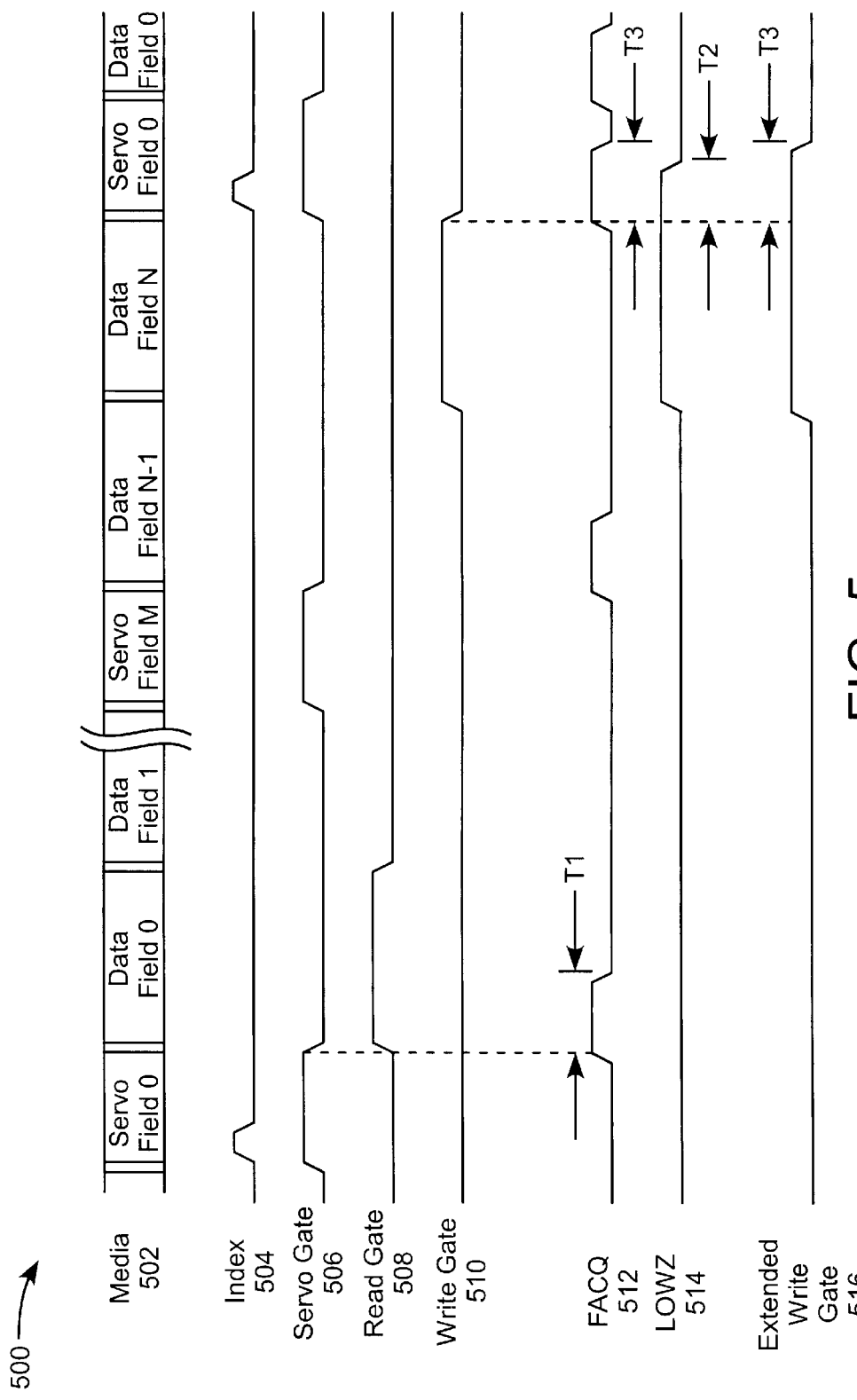
FIG. 5 illustrates an exemplary timing diagram of the programmable generic read control logic device relative to storage media being accessed in accordance with one embodiment of the present invention.

FIG. 5 illustrates an exemplary timing diagram 500 of the programmable generic read control logic device 206 relative to storage media 502 being accessed in accordance with one embodiment of the present invention. The storage media 502 may be tracks on a rotating magnetic disk having both servo fields and data fields. The storage media 502 include both servo fields for storing servo data and data fields for storing user data. Corresponding to the servo field 0, a signal index 504 is generated by the hard disk controller 108 to indicate completion of one revolution of the disk by monitoring a spindle motor speed and circumference reference in the disk. As shown, the index signal 504 is activated immediately after the first servo field 0 is encountered.

As discussed above, the hard disk controller 108 generates a servo gate signal 506, a read gate signal 508, and a write gates signal 510. The servo gate signal 506 is activated high when a servo field is detected in the media. The read gate signal 508 from the hard disk controller 108 is asserted when a desired data field to read data from is encountered in the media 502. Similarly, the write gate signal 510 is asserted high when a desired data field to write data to is found in the media 502.

In accordance with one embodiment, the generic read channel logic device 206 is programmable to generate any suitable control signals such as FACQ, LOWZ, extended write gate, and other signals that may be required by different data recovery devices to facilitate sequencing of read/write operations. By way of example, the generic read channel logic device 206 may be programmed to generate FACQ signal 512 to trigger the data recovery device 112 into fast acquisition mode when reading a servo or data field. The FACQ signal is assembled from a T1 pulse, which is provided by the Machine Control inputs enMC, set_p1, and reset_p1 and a T3 pulse, which is provided by the long write gate trailing edge pulse using enWGLTE. In this setting, the FACQ signal 512 is activated high whenever the trailing edge of the servo gate signal 506 or write gate signal 510 occurs. The FACQ pulse thus ensures that the gain of an internal amplifier in the data recovery device 112 is adjusted properly for a read operation.

Similarly, the generic read channel logic device 206 may also be programmed to generate LOWZ signal 514 whenever the write gate pulse occurs. The LOWZ signal 514 is constructed from the write gate (enWG) and the T2 pulse generated by the short write gate trailing edge pulse (enWGSTE). It should be noted that period T3 is longer than T2 by a small margin. In this configuration, the LOWZ signal remains active for a period T2 longer after the write gate pulse terminates. When LOWZ signal terminates at the end of T2, the FACQ signal becomes active again after T3.

Additionally, the generic read channel logic device 206 may also generate an extended write gate signal 516 to provide an extended write gate signal. In this case, the bit value in the configuration register enWG 316 is set to enable write gate signal while the bit value in the configuration register enWGLTE is set to enable write gate long trailing edge. Additionally, the long write gate extension timer 406 is loaded with time value T3. This setting enables the long write gate extension timer to provide WGLLE and WGLTE signals to AND gates 422 and 424. The resulting extended write gate signal 516 is activated on the trailing edge of write gate signal 510. Similarly, the short write gate extension timer 408 may be loaded with a time value T4 to provide a version of the write gate signal that is of shorter duration. The following table 2 shows enable states of configuration registers 202 for generating various signals at the output pin 480 in accordance with one embodiment of the present invention.

TABLE 2

| Configuration Register | FACQ | LOWZ | Extended Write gate |
| --- | --- | --- | --- |
| enRGLLE | Disabled | Disabled | Disabled |
| enRGLTE | Disabled | Disabled | Disabled |
| enRG | Disabled | Disabled | Disabled |
| enRGSLE | Disabled | Disabled | Disabled |
| enRGSTE | Disabled | Disabled | Disabled |
| enWGLLE | Disabled | Disabled | Disabled |
| enWGLTE | Enabled | Disabled | Enabled |
| enWG | Disabled | Enabled | Enabled |
| enWGSLE | Disabled | Disabled | Disabled |
| enWGSTE | Disabled | Enabled | Disabled |
| enMC | Enabled | Disabled | Disabled |
| p1pol | Disabled | Disabled | Disabled |

The programmable generic read channel control logic device of the present invention thus allows any input signals to be combined in any suitable manner to meet the requirements of wide variety of read/write channel devices. This eliminates the need for costly external circuitry and produces a single device that is capable of controlling a variety of read/write channel devices that have different signal requirements. Thus, the programmable read channel control logic device provides significant savings in design cost.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A programmable generic read channel control device for generating an output signal to control read/write operations, comprising:

a set of extension timers programmed to generate a set of pulses of programmable width in response to a read gate and write gate signal, wherein each of the pulses is defined by a leading edge pulse and a trailing edge pulse, the set of extension timers including a short write gate extension timer configured to generate a write gate short leading edge pulse and a write gate short trailing edge pulse defining a write gate short pulse width;

a set of configuration registers for storing a set of configuration data for the pulses, each configuration register storing one configuration data for either a leading edge or a trailing edge pulse of one of the pulses, wherein the configuration data indicates whether the associated pulse is enabled;

a set of AND gates arranged to receive the pulses of programmable width, each AND gate receiving either a leading edge or a trailing edge of one of the pulses as a first input, each AND gate also receiving a configuration data as a second input that allows the first input to be transmitted as an output signal when the configuration data at the second input is enabled; and an OR gate being arranged to combine the output signals from the set of AND gates to generate the output signal such that the output signal is generated from only the leading or trailing edges of the pulses from the AND gates receiving the enable signals.

2. A programmable generic read channel control device as recited in claim 1, further comprising:

a flip-flop receiving a set of first control signals for setting and resetting the output signal of the OR gate.

3. The programmable generic read channel control device as recited in claim 2, wherein the flip-flop is arranged to receive a set of second control signals to override the first control signals.

4. The programmable generic read channel control device as recited in claim 1, wherein the set of extension timers comprises:

a long read gate extension timer configured to generate a read gate long leading edge pulse and a read gate long trailing edge pulse defining a read gate long pulse width;

a short read gate extension timer configured to generate a read gate short leading edge pulse and a read gate short trailing edge pulse defining a read gate short pulse width; and a long write gate extension timer configured to generate a write gate long leading edge pulse and a write gate long trailing edge pulse defining a write gate long pulse width.

5. The programmable generic read channel control device as recited in claim 4, further comprising:

an XOR gate coupled to receive the output signal from the OR gate and a polarity control signal to indicate a polarity of the output signal, wherein the XOR gate changes the polarity of the output signal when the polarity control signal is enabled for output and wherein the XOR gate outputs the output signal when the polarity control signal is not enabled.

6. The programmable generic read channel control device as recited in claim 4, further comprising:

an output pin for outputting the output signal to external circuits; and an output driver coupled between the OR gate and the output pin for driving the output signal into the output pin.

7. The programmable generic read channel control device as recited in claim 2, further comprising:

a servo control processor configured to generate the first control signals for input to the flip-flop.

8. The programmable generic read channel control device as recited in claim 2, wherein the flip-flop receives a second set of control signals to override the first control signals.

9. A programmable generic read channel control device for generating an output signal to control read/write operations, comprising:

a set of extension timers for storing a set of time values for generating a set of pulses of programmable width in response to a read gate and write gate signal, wherein each of the pulses is defined by a leading edge pulse and a trailing edge pulse, the set of extension timers including a short write gate extension timer configured to generate a write gate short leading edge pulse and a write gate short trailing edge pulse defining a write gate short pulse width;

a set of configuration registers for storing a set of configuration data for the pulses, each configuration register storing one configuration data for either a leading edge or a trailing edge pulse of one of the pulses, wherein the configuration data indicates whether the associated pulse is enabled;

a set of AND gates arranged to receive the pulses of programmable width, each AND gate receiving either a leading edge or a trailing edge of one of the pulses as a first input, each AND gate also receiving a configuration data as a second input that allows the first input to be transmitted as an output signal when the configuration data at the second input is enabled;

an OR gate being arranged to combine the output signals from the set of AND gates to generate the output signal such that the output signal is generated from only the leading or trailing edges of the pulses from the AND gates receiving the enable signals; and a flip-flop receiving a set of first control signals for setting and resetting the output signal of the OR gate.

10. The programmable generic read channel control device as recited in claim 9, wherein the flip-flop is arranged to receive a set of second control signals from an external processor to override the first control signals.

11. The programmable generic read channel control device as recited in claim 9, wherein the set of extension timers comprises:

a long read gate extension timer configured to generate a read gate long leading edge pulse and a read gate long trailing edge pulse defining a read gate long pulse width;

a short read gate extension timer configured to generate a read gate short leading edge pulse and a read gate short trailing edge pulse defining a read gate short pulse width; and a long write gate extension timer configured to generate a write gate long leading edge pulse and a write gate long trailing edge pulse defining a write gate long pulse width.

12. The programmable generic read channel control device as recited in claim 11, further comprising:

an XOR gate coupled to receive the output signal from the OR gate and a polarity control signal to indicate a polarity of the output signal, wherein the XOR gate changes the polarity of the output signal when the polarity control signal is enabled for output and wherein the XOR gate outputs the output signal when the polarity control signal is not enabled.

13. The programmable generic read channel control device as recited in claim 12, further comprising:

an output pin for outputting the output from the XOR gate to an external circuit; and an output driver coupled between the XOR gate and the output pin for driving the output signal into the output pin.

14. The programmable generic read channel control device as recited in claim 12, further comprising:

a servo control processor configured to generate the first control signals for input to the flip-flop.

15. A programmable generic read channel control circuitry for generating an output signal to control read/write operations, comprising:

a first extension timer capable of storing a first time value for generating a first pulse width in response to a read gate signal;

a second extension timer capable of storing a second time value for generating a second pulse width in response to the read gate signal;

a third extension timer capable of storing a third time value for generating a third pulse of programmable width in response to a write gate signal;

a short write gate extension timer capable of storing a fourth time value for generating a write gate short leading edge pulse and a write gate short trailing edge pulse defining a fourth pulse of programmable width in response to the write gate signal, wherein the first, second, third, and fourth pulses are each defined by a leading edge and a trailing edge;

a set of AND gates arranged to receive the pulses of programmable width, each AND gate receiving either a leading edge or a trailing edge of one of the pulses as a first input, each AND gate also receiving an enable signal as a second input that allows the first input to be transmitted as an output signal when the enable signal at the second input is active; and an OR gate being arranged to combine the output signals from the set of AND gates to generate the output signal such that the output signal is generated from only the leading or trailing edges of the pulses from the AND gates receiving the enable signals.

16. The programmable generic read channel control circuitry as recited in claim 15, further comprising:

a flip-flop receiving a set of first control signals for setting and resetting the output signal of the OR gate.

17. The programmable generic read channel control circuitry as recited in claim 16, wherein the flip-flop is arranged to receive a set of second control signals to override the first control signals.

18. The programmable generic read channel control circuitry as recited in claim 15, wherein the first extension timer is a long read gate extension timer configured to generate a read gate long leading edge pulse and a read gate long trailing edge pulse defining the first pulse width.

19. The programmable generic read channel control circuitry as recited in claim 15, wherein the second extension timer is a short read gate extension timer configured to generate a read gate short leading edge pulse and a read gate short trailing edge pulse defining the second pulse width.

20. The programmable generic read channel control circuitry as recited in claim 15, wherein the third extension timer is a long write gate extension timer configured to generate a write gate long leading edge pulse and a write gate long trailing edge pulse defining the third pulse width.

21. The programmable generic read channel control circuitry as recited in claim 15, further comprising:

an XOR gate coupled to receive the output signal from the OR gate and a polarity control signal to indicate a polarity of the output signal, wherein the XOR gate changes the polarity of the output signal when the polarity control signal is enabled for output and wherein the XOR gate outputs the output signal when the polarity control signal is not enabled.

22. The programmable generic read channel control circuitry as recited in claim 15, further comprising:

an output pin for outputting the output signal to external circuits; and an output driver coupled between the OR gate and the output pin for driving the output signal into the output pin.

* * * * *